June 4, 1946.  T. R. SMITH  2,401,377
GATE VALVE CONSTRUCTION
Filed Nov. 27, 1942

INVENTOR.
Thomas R. Smith,
BY
Parkinson & Lane
Attys

Witness:
Chas. R. Koursh.

Patented June 4, 1946

2,401,377

UNITED STATES PATENT OFFICE 2,401,377

GATE VALVE CONSTRUCTION

Thomas R. Smith, Newton, Iowa, assignor to The Maytag Company, Newton, Iowa, a corporation of Delaware Application November 27, 1942, Serial No. 467,117

6 Claims. (Cl. 251—159)

The present invention relates to gate valve constructions and more particularly to a novel gate valve assembly and sealing means carried thereby for effecting a fluid-tight seal between adjacent sections of the flow line.

The novel construction comprehends a novel valve assembly including a resilient packing or sealing ring disposed at the opposite sides of the gate and in the novel means and manner of anchoring the sealing ring upon the gate to permit this ring to shift or pivot about its base or vertex. By this novel construction and arrangement, sealing is accomplished without metal-to-metal contact and without the application of undue pressure upon the seal, thereby eliminating wear or other damage to the sealing surfaces.

A further object is to provide a novel gate valve seal which will operate with optimum efficiency at any pressure encountered in the flow line. Another object is the provision of a novel seal for sealing the packing gland.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

Figure 1:
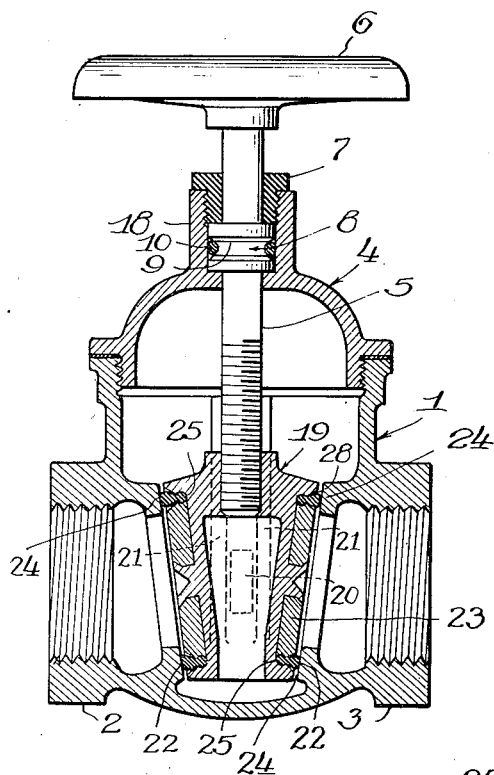
Figure 1 is a view in vertical cross section through the novel gate valve construction.
Figure 2:
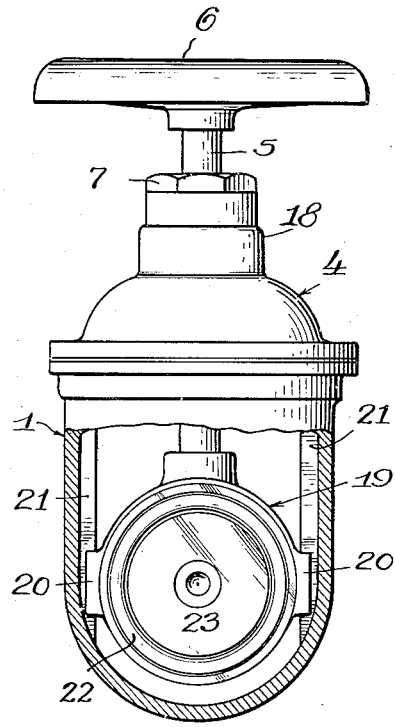
Figure 2 is a view, part in end elevation and part in vertical cross section, through the construction of Figure 1.

Referring more particularly to the disclosure in the drawing, the valve casing 1 is shown as provided with oppositely extending connections 2 and 3 for connecting or attaching the casing to the pipes or mains of a flow line. Detachably mounted upon the upper end of the casing is a bonnet or cap 4 through which extends a valve stem 5 having at its upper end a suitable operating handle or wheel 6. The bonnet is closed at its upper end by a threaded flange nut 7. Disposed below this nut is a gland 8 provided with a substantially V-shaped groove or recess 9 in which is positioned a substantially wedge-shaped resilient sealing ring or packing 10. This sealing ring has its vertex 11 rounded to substantially conform to the curvature of the base 12 of the recess. The opposite sides 13 and 14 of the sealing ring or packing are disposed at an angle of approximately 45° with the opposite sides 15 and 16 of the groove or recess disposed at an angle of approximately 60° whereby the resilient packing or sealing ring may pivot or slip within the groove or recess about its vertex. The sealing face 17 of the ring or packing is also curved and extends beyond the recess to an amount sufficient to permit the packing to be compressed and engage the interior surface of the extension 18 of the bonnet and thereat effectively seal the gland against leakage.

The gate 19 is threaded onto the lower end of the stem 5 and movable longitudinally therewith as the handle 6 is rotated to raise or lower and thereby open or close the gate. Projections 20 adapted to be received within the guideways 21, guide the vertical movement of the gate. Within each of the opposite faces of the gate is mounted a packing or sealing ring 22 and anchored therein by means of a collar or plate 23. This sealing ring is similar in construction, operation and arrangement as the sealing ring 10, except that it is anchored or held in place due to the fact that part of the time the packing is not disposed against the annular seat or sealing surface 24.

Figure 3:
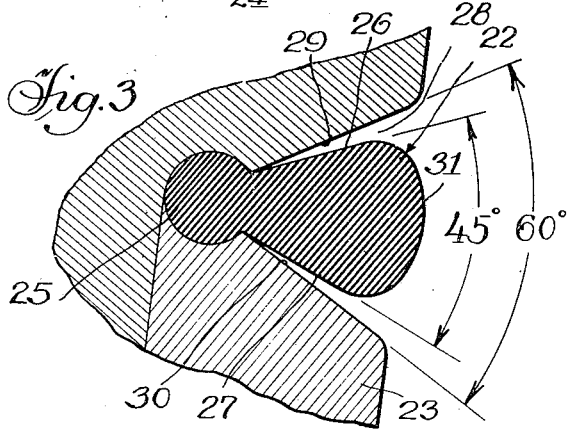
Figure 3 is an enlarged view in vertical cross section through the sealing ring for the gate valve.
Figure 4:
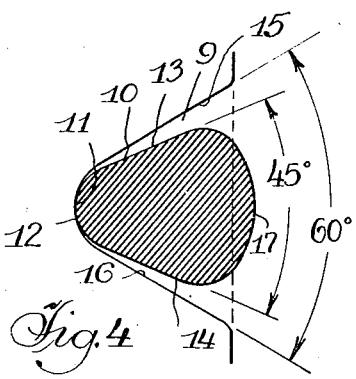
Figure 4 is a view similar to Figure 3 but disclosing the sealing ring or packing for the gland.

In order to anchor the sealing ring or packing 22 in position, it is provided with a bulge or enlarged rounded end portion 25 received in a complementary or similarly shaped recess partially formed within the body of the gate valve 19 and partially within the collar or plate 23, as more clearly shown in Figure 3. The sealing surface of this packing is shaped similarly to the packing 10 with its opposite sides 26 and 27 disposed at an angle of approximately 45° and with the recess 28, formed by the adjoining surfaces of the valve body 19 and plate 23, having its opposite sides 29 and 30 disposed at an angle of approximately 60°. This permits the sealing ring or packing 22 to pivot or shift about its end 25 as it is moved into sealing contact with the annular seat or sealing surface 24. It will be apparent from Figure 3 that the sealing face 31 of this packing normally extends a substantial distance beyond the groove or recess 28 so as to form an effective seal at all times and to eliminate any metal-to-metal contact between the gate and the seat 24.

The sealing elements or packing rings 10 and 22 are of a resilient material and preferably of a rubber or rubber-like material such as natural or compounded synthetic rubber.

Having thus disclosed the invention, I claim:

1. In a gate valve construction including a valve body having a fluid passage and a seat surrounding the passage, an adjustable gate adapted to open or close the passage and provided within an annular substantially V-shaped recess opening toward the seat in the closed position of the gate, and a resilient packing ring carried in the recess and provided with a base portion anchored in the bottom of the recess and a flexible sealing portion having its opposite sides normally spaced from the sides of the recess and provided with a seat engaging face extending beyond the recess.

2. A gate valve comprising a valve body having a fluid passage therethrough and a seating surface encompassing the passage, a gate adapted to be raised or lowered to open or close the passage, an annular substantially V-shaped recess provided in the face of and opening toward the seating surface in the closed position of the gate, a substantially wedge-shaped resilient packing ring carried in the recess and having a base portion anchored in the recess and a flexible sealing part extending beyond the recess for sealing contact with the seating surface when the gate is in lowered position, the sides of the recess being disposed at an angle greater than that defined by the sides of the packing ring whereby the latter may pivot or shift within its recess and provide effective sealing without the application of undue pressure.

3. In a gate valve construction including a valve body having a fluid passage and a flat valve seat encompassing the passage, an adjustable gate adapted to open or close the passage and provided with an annular recess opening toward the seat in the closed position of the gate, and a resilient, substantitally wedge-shaped sealing ring having a part at its reduced end anchored within the bottom of the recess for pivotal movement and a flexible sealing face projecting beyond the recess for sealing contact with the seat.

4. In a gate valve construction including a valve body having a fluid passage and a seat surrounding the passage, an adjustable gate adapted to open or close the passage and provided with an annular recess opening toward the seat in the closed position of the gate, and a sealing element carried in the recess and comprising a resilient member having a base portion anchored in the bottom of the recess and a flexible sealing portion having a sealing surface normally projecting beyond the recess for engagement with the seat, said recess being sufficiently larger than the sealing element as to accommodate the mass of said element when the valve is in closed position.

5. In a gate valve construction including a valve body having a fluid passage and a seat surrounding the passage, an adjustable gate adapted to open or close the passage and provided with an annular recess opening toward the seat in the closed position of the gate, and a sealing element carried in the recess and comprising a resilient member having an enlarged part anchored in the bottom of the recess and a flexible part having a rounded sealing face projecting beyond the recess for engagement with the seat, said recess being sufficiently larger than the sealing element as to accommodate the mass of said element when the valve is in closed position.

6. In a sealing construction adapted to prevent a fluid from passing through an outlet and a seat surrounding the outlet, a member provided with a recess adapted to encompass the outlet and opening toward the seat in the sealing position, a sealing element having a part securely anchored in the recess and a flexible sealing portion having a sealing surface normally projecting beyond the recess, said recess being sufficiently larger than the sealing element as to accommodate the mass of the element when the member is in sealing position.

THOMAS R. SMITH.